E. T. CROWN.
EASY STARTING DEVICE FOR AUTOMOBILES.
APPLICATION FILED AUG. 25, 1919.

1,393,268. Patented Oct. 11, 1921.

Witness
Thos. W. Riley

Inventor
E. T. Crown
By W. J. Fitz Gerald
Attorney

UNITED STATES PATENT OFFICE.

EARL TAYLOR CROWN, OF ST. PETERSBURG, FLORIDA.

EASY-STARTING DEVICE FOR AUTOMOBILES.

1,393,268.  Specification of Letters Patent.  Patented Oct. 11, 1921.

Application filed August 25, 1919. Serial No. 319,538.

*To all whom it may concern:*

Be it known that I, EARL T. CROWN, a citizen of the United States, residing at St. Petersburg, in the county of Pinellas and State of Florida, have invented certain new and useful Improvements in Easy-Starting Devices for Automobiles; and I do hereby declare the following to be a full, clear, and exact description of the invention, such as will enable others skilled in the art to which it appertains to make and use the same.

The present invention relates to a device adapted especially for use on Ford and similar automobiles to render it easier to start the engine.

After a Ford automobile has been run for a considerable distance (about eight or ten thousand miles in practice) it becomes more difficult to start the engine by the usual crank, owing to wear and loose play that develops, permitting the armature and field of the magneto to separate and thus materially weaken the sparks produced in cranking the engine with the transmission gearing in neutral. The present device is designed to remedy this difficulty in starting, and it is the object to combine with the usual mechanism of a Ford automobile, a simple and inexpensive device which will efficiently serve to retain the armature and field of the magneto in close relation during the starting of the engine, so that the engine can be started easily and quickly.

With the foregoing and other objects in view, which will be apparent as the description proceeds, the invention resides in the construction and arrangement of the parts hereinafter described and claimed, it being understood that changes can be made within the scope of what is claimed without departing from the spirit of the invention.

The invention is illustrated in the accompanying drawing, wherein:—

Figure 1:
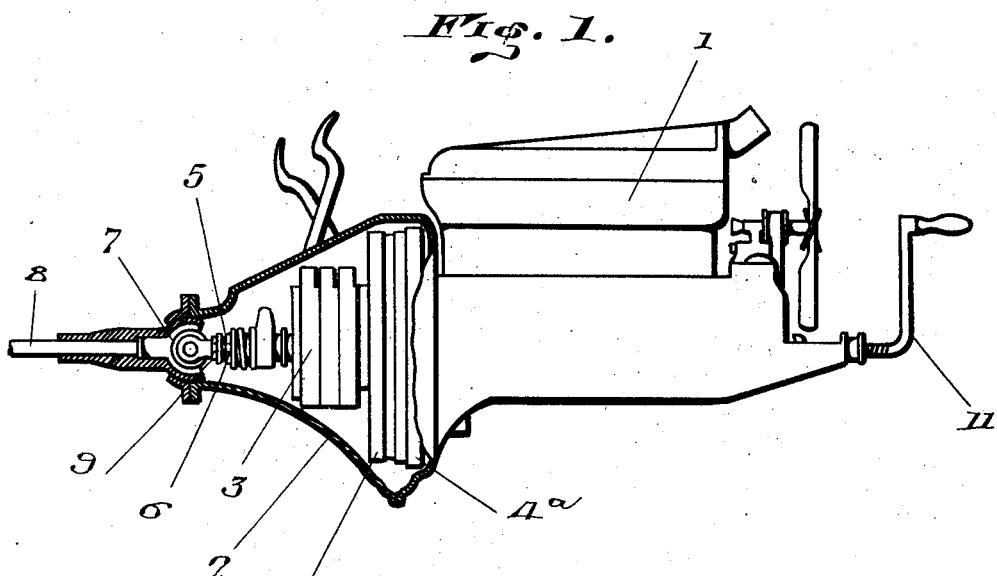
Figure 1 is a side elevation of a Ford automobile engine, portions being broken away, showing the device applied.
Figure 2:
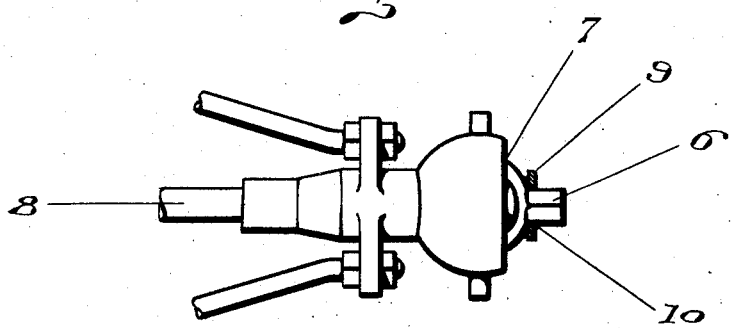
Fig. 2 is an enlarged plan view of the universal joint between the transmission gearing and propeller shaft showing the device in place.
Figure 3:
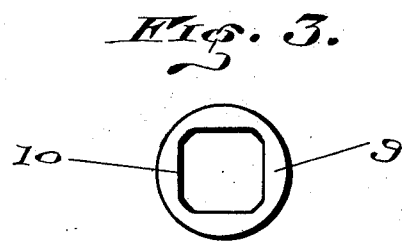
Fig. 3 is an enlarged face view of the device.

In the drawing there is depicted a Ford automobile engine 1 having the transmission casing 2 which houses the usual transmission gearing 3 and magneto. The magneto includes a fly wheel and armature 4 rotatable with the engine crank shaft and gearing, and a field 4ª to induce current in said armature, as is well understood in the art. The transmission gearing or unit is provided at its rear end with a socket member 5 receiving the stub 6 of the universal joint 7 which connects the transmission gearing and propeller shaft 8. The stub 6 and socket of the member 5 are of square cross section so as to drive the propeller shaft from said gearing.

When the engine has been run for an extended period, it is found that when the transmission gearing is placed in neutral and the starting crank 11 shoved rearwardly for starting the engine, the armature 4 of the magneto is permitted to move rearwardly by the rearward thrust against the engine crank shaft, thereby separating the armature and field. This results in an impaired operation of the magneto, and the sparks will be weak, making it hard to start the engine, even by spinning the crank shaft. As a result, it is necessary to rotate the crank with considerable force and speed to develop sufficient electrical potential to start the engine. This is due to the transmission gearing being in neutral which permits the armature to move or shift rearwardly assisted by wear of the mechanism permitting of loose play.

To remedy this difficulty, a ring 9 of suitable thickness is placed on the stub 6, and has a square hole fitting said stub, to cause said ring to rotate with the universal joint. This ring, when the stub 6 is inserted in the socket member 5, will hold said socket member and parts of the transmission mechanism, including the armature 4, forwardly, thereby maintaining the armature 4 in close relation with the magneto field 4ª. This ring 9, by holding the magneto in forward position, will not interfere with the operation of the gearing, magneto or engine, but will, when the gearing is placed in neutral, and the starting crank 11 shoved rearwardly, prevent the parts of the magneto being separated. As a result, the magneto will give off strong electrical current so that the engine can be started easily and quickly. The device is readily installed by simply separating the universal joint 7 and transmission gearing and placing the device on the stub 6 after which the stub is inserted in the socket member 5 and parts assembled.

Having thus described the invention, what is claimed as new is:—

The combination of an engine, a transmission gearing having a socket member, a magneto, part of which is carried by said gearing, a propeller shaft, a universal joint connected to said propeller shaft and having a stub fitted removably in said socket member, and a ring fitted removably on said stub to shift said socket member and part of the magneto, to hold the parts of the magneto close together when starting the engine.

In testimony whereof I have signed my name to this specification in the presence of two subscribing witnesses.

EARL TAYLOR CROWN.

Witnesses:
MARY E. CAMP,
J. S. DAVIS.